Aug. 25, 1970     J. PELLERIN     3,525,151

PROCESS FOR AUTOMATICALLY MAKING ELECTRIC BATTERIES

Original Filed March 29, 1966     9 Sheets-Sheet 1

INVENTOR
JEAN PELLERIN
BY
ATTORNEYS

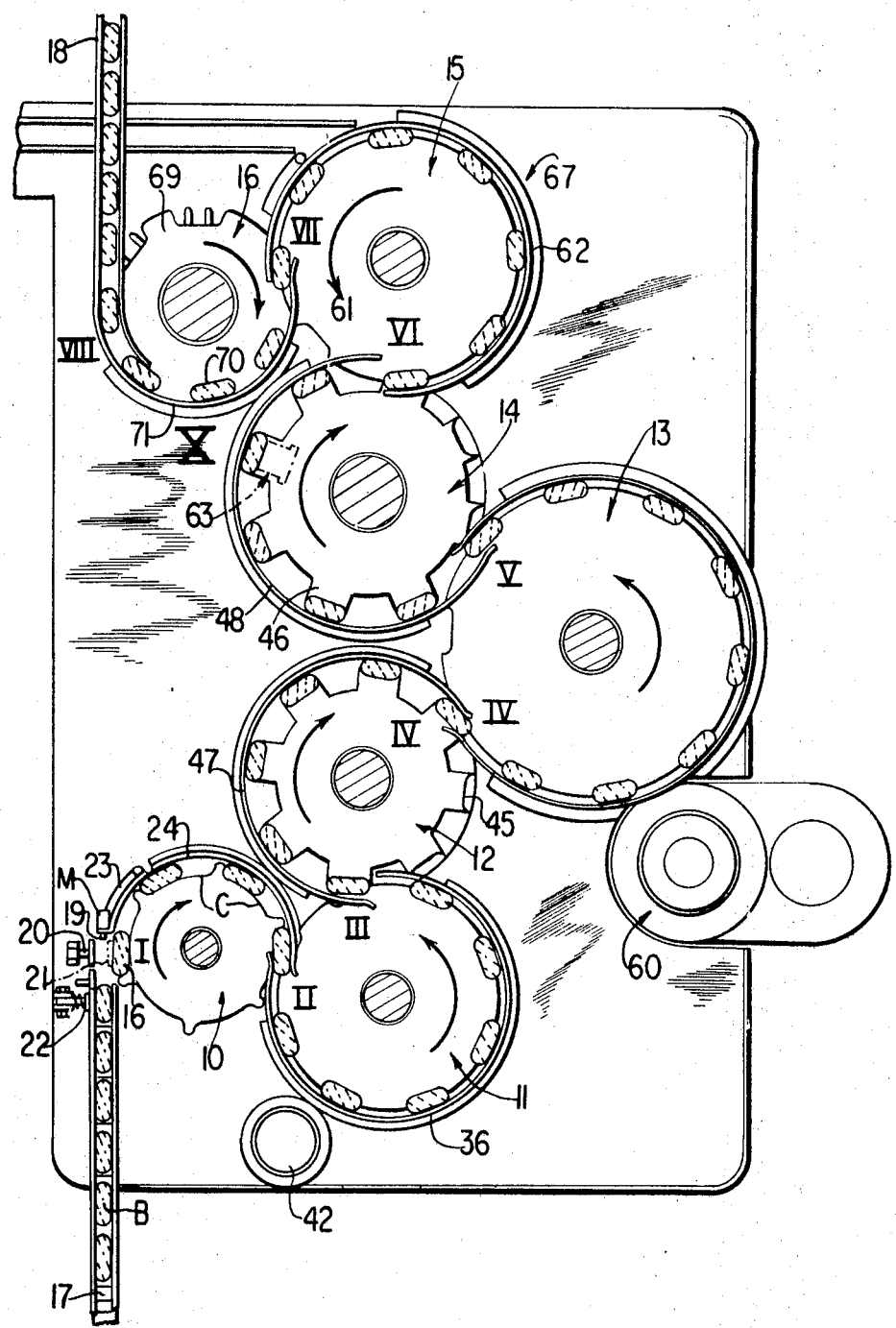

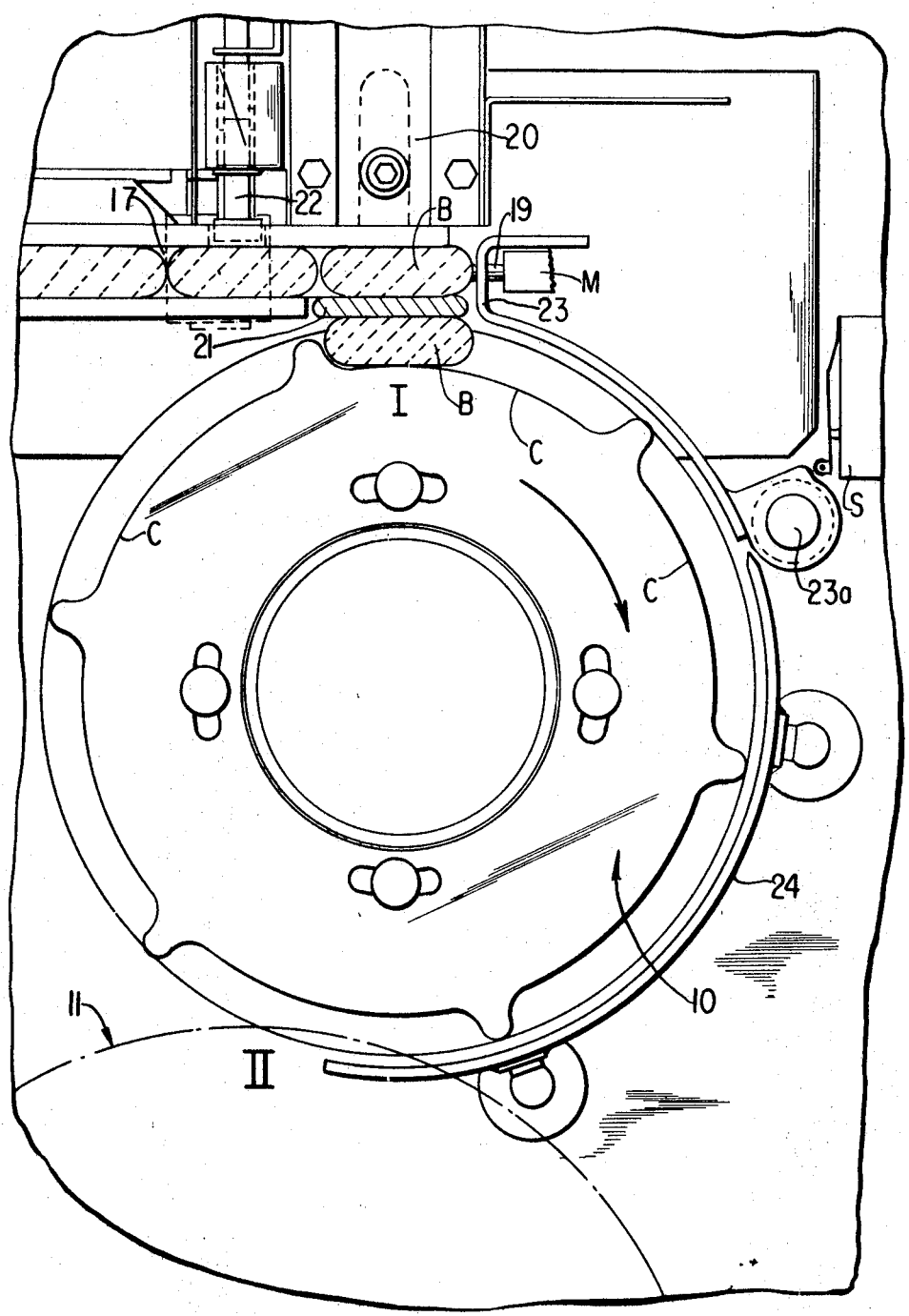

INVENTOR
JEAN PELLERIN
BY
ATTORNEY

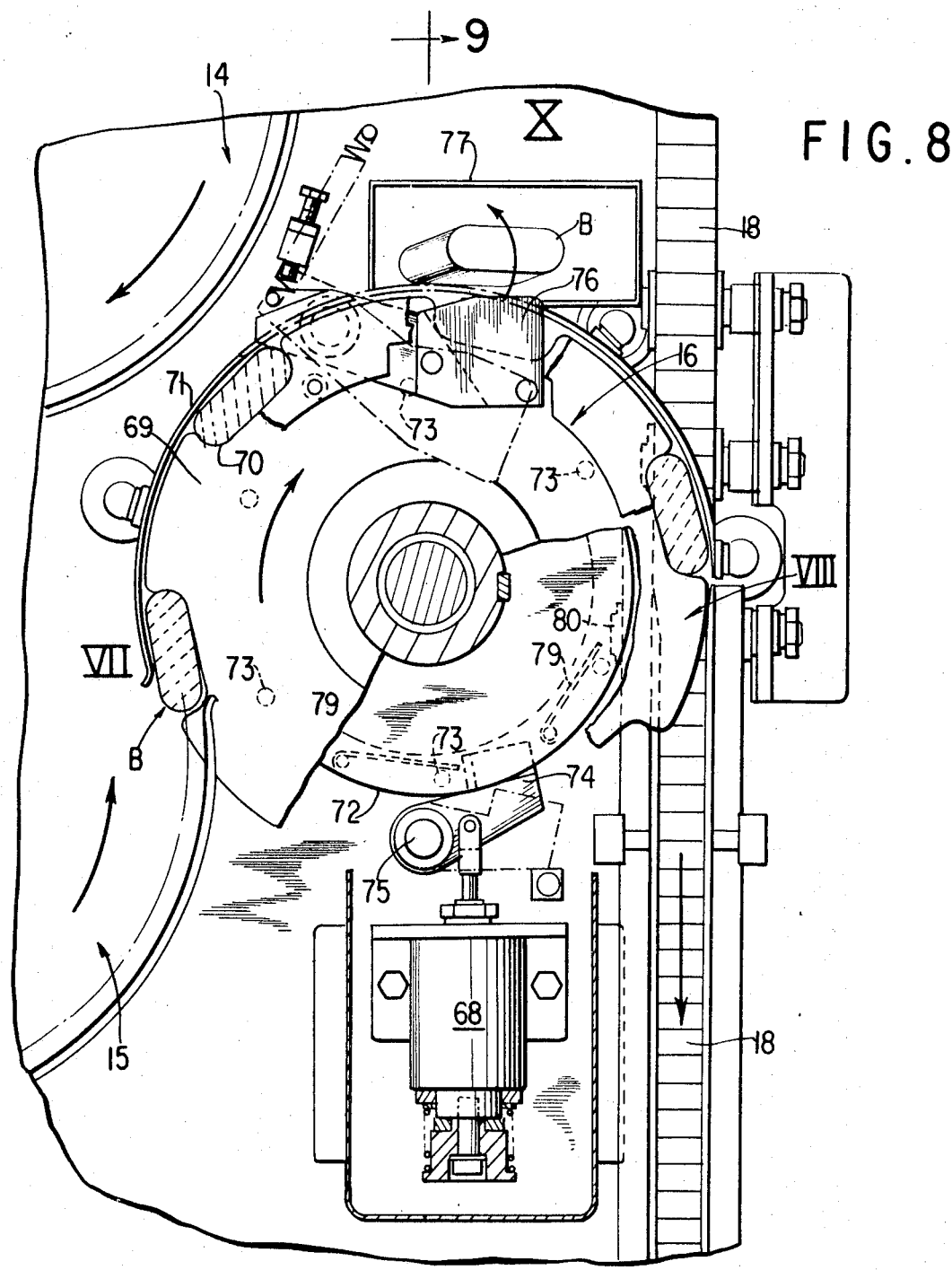

Aug. 25, 1970     J. PELLERIN     3,525,151
PROCESS FOR AUTOMATICALLY MAKING ELECTRIC BATTERIES
Original Filed March 29, 1966     9 Sheets-Sheet 8
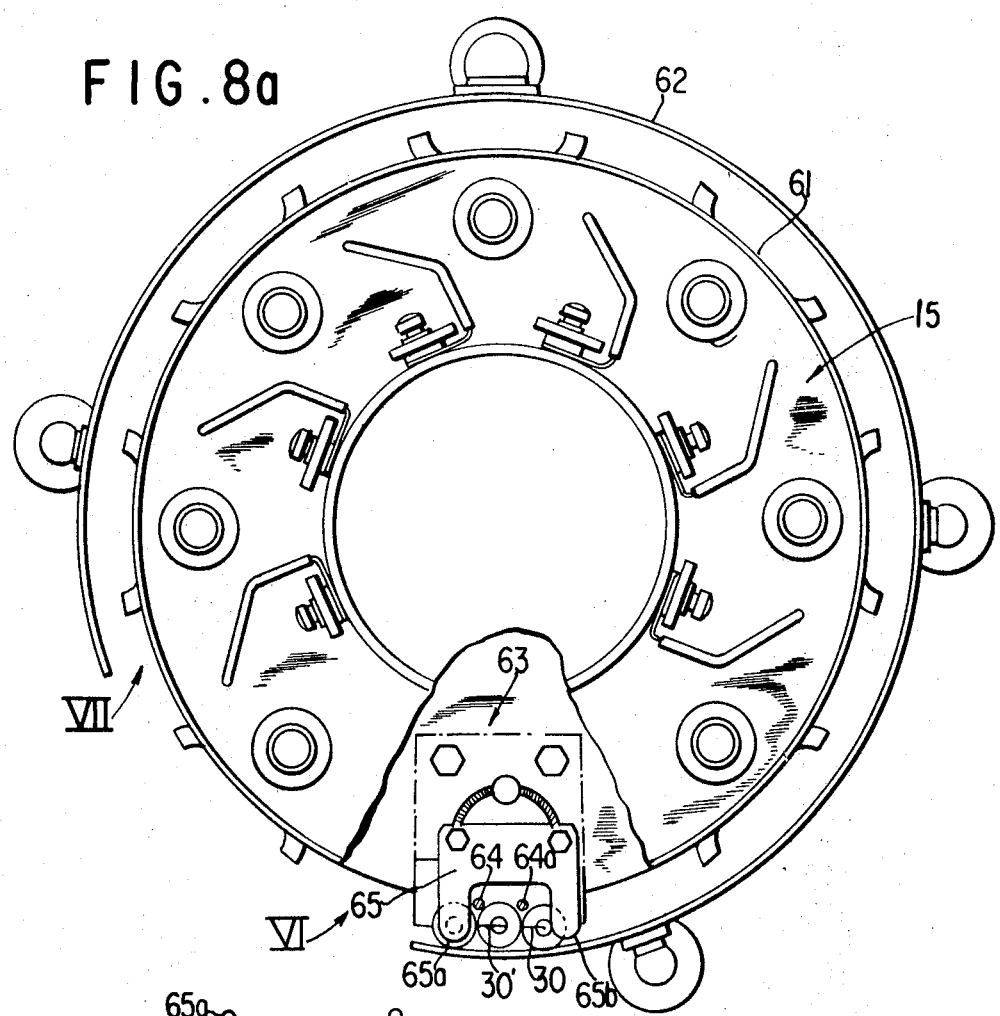
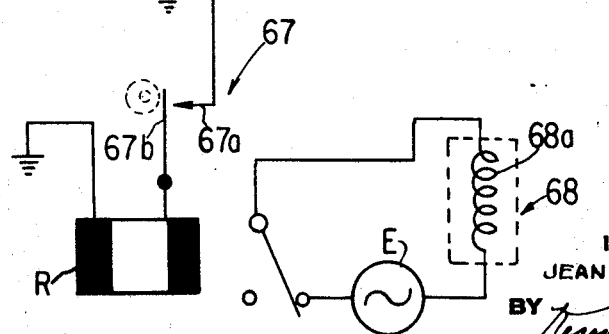
INVENTOR
JEAN PELLERIN
BY
ATTORNEYS

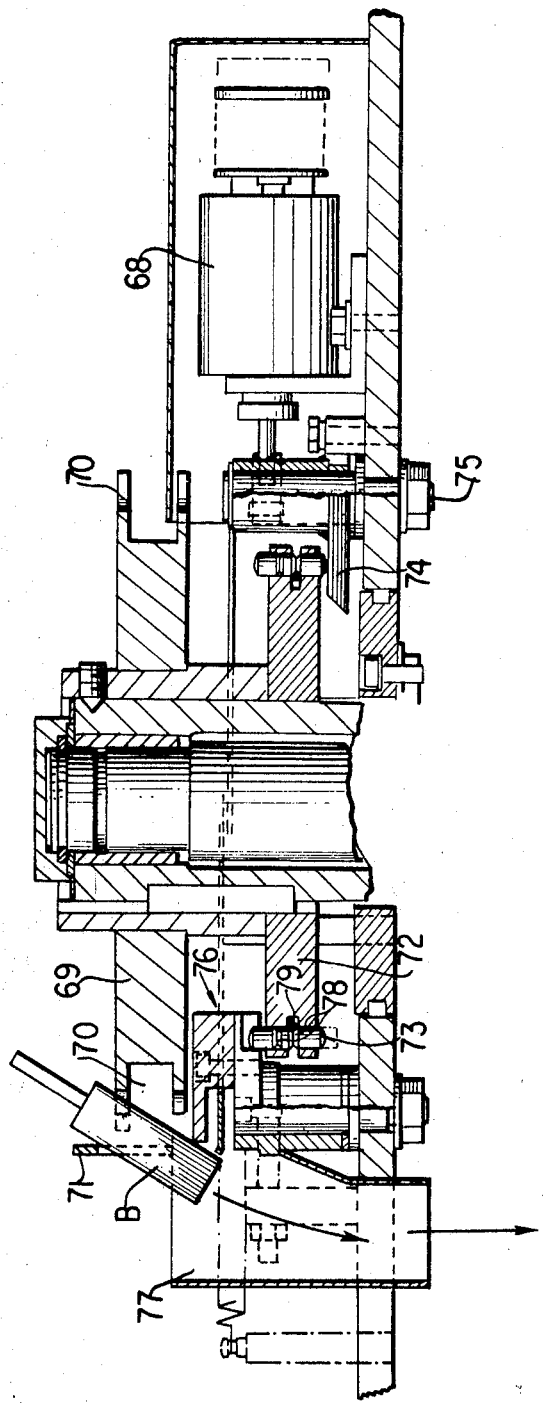

United States Patent Office 3,525,151
Patented Aug. 25, 1970

3,525,151
PROCESS FOR AUTOMATICALLY MAKING
ELECTRIC BATTERIES
Jean Pellerin, Poitiers, France, assignor to Societe des
Accumulateurs Fixes et de Traction (Societe Anonyme),
Romainville, Seine-St.-Denis, France, a company of
France
Original application Mar. 29, 1966, Ser. No. 538,278, now
Patent No. 3,394,858. Divided and this application
Nov. 2, 1967, Ser. No. 704,962
Int. Cl. H01b 13/00
U.S. Cl. 29—624  3 Claims

ABSTRACT OF THE DISCLOSURE

A continuous automatic method of effecting interconnection of a group of unconnected cells to form a battery comprising the steps of first assembling said group of interconnected cells in spaced proximity in a casing, each cell having a metallic central terminal cap and an unconnected interconnecting conduit element electrically joined to the other terminal of each cell, moving such cells to a first processing zone and there applying treating solution to said caps and cambering the respective interconnecting conduit elements for application to the respective caps of adjacent cells, moving said cells to a second processing zone and pressing the respective interconnecting elements onto the respective underlying caps and soldering them thereto by applying soldering elements and solder thereto, moving said cells to a third processing zone and there testing the mechanical security of the soldered joints between elements and cap and electrically testing the voltage of the group of connected cells, and rejecting defective batteries in a zone beyond said third zone as a result of said testing, the time in transit through each of the zones being sufficient to complete the respective treatments described therein.

This application is a division of application Ser. No. 538,278, filed Mar. 29, 1966, now Pat No. 3,394,858.

This invention relates to an apparatus and process for automatically making electric batteries. It is more particularly concerned with the soldering operations for effecting interconnections between cells and with the testing of electric batteries comprising several interconnected cells.

Automatic machines relying on the principle of continuous kinematics are already known. The machine of this invention utilizes this principle. In these machines, as embodied herein, the articles which are being processed are moved along successively through several turrets which are positioned tangentially in relation to each other, their tangential speeds being equal. Such machines comprise several processing turrets separated by transfer turrets. The processing turrets comprise a number of berths in which the articles to be processed are placed, a processing means being located on each turret opposite each berth, such processing means being fixed in relation to the corresponding berth. Only one operation or one series of operations is effected on each processing turret, the time of the operation or of the series of operations being effected is the time during which an article remains on the said turret.

Such machines permit very high manufacturing rates.

Objects and features of the invention are the provision of a process for making interconnections between cells of batteries and for automatically testing the electric batteries after interconnection of their cells, and are more especially notable in that the assembled cells intended to form respective batteries are first properly oriented to the same relative angular position, then the portions to be soldered are pickled to cleanse them, then the interconnecting elements or wires of some cells are turned down upon the caps of other cells, then the soldering operations are performed on such wires, and lastly, electrical and mechanical testing operations are performed on interconnected cells so that the defective batteries can be rejected.

Other objects and features of the invention are the provision of a machine for automatically performing a sequence of operations on successive groups of assembled cells each constituting a battery and more especially related to the manufacture of electric batteries, and more particularly intended for the operations of applying the electric interconnections in the right places, soldering these connections and then testing the resulting batteries comprising several interconnected cells, by utilizing the said process. Said machine comprises generally an input conveyor, a first transfer turret or input turret, a first processing turret on which the cells are oriented to the correct angle, the areas to be soldered are pickled or have flux applied for cleansing and the interconnecting elements are cambered, a second transfer turret, a second processing turret in which the interconnecting elements are applied onto the cell caps and the soldering operations are performed, a third transfer turret, a third processing turret on which the mechanical and electric testing operations are performed on successive batteries whose cells have been interconnected and a fourth transfer turret or output turret on which the defective batteries are picked out for rejection, said apparatus being more especially characterized by the fact that measures are taken for maintaining the battery arriving at the entrance to the input turret at a given distance from the preceding battery during the time taken for inserting the latter into said input turret.

According to an embodiment of the invention, the battery following the battery arriving at the entrance of the input turret is held back or retarded by an automatic braking device dependent upon the device introducing the successive batteries into the input turret.

According to another embodiment, the spacing between the said two batteries is effected by means of a variable pitch screw.

According to another characteristic and feature of the invention, the soldering turret comprises one arm provided with heating soldering peens for each processing station thereof, said arm rotating and dipping the end of the said peens in one tank placed in a fixed position in relation to the turret, said tank containing solder, the trajectory of the peens in relation to the solder tank being designed so that the dipping into the solder is effected at the lowest possible speed.

According to a further embodiment, the said trajectory comprises a retrogression point situated on a level with the solder tank.

Other objects, features and characteristics of the invention will become apparent both from the following description, presented for illustrative and not for limitative purposes and from the accompanying drawings in which:

FIG. 1 diagrammatically shows groups of assembled cells intended to form a battery in the condition when it is inserted in the machine embodying the invention;

FIG. 2 is a general diagrammatic plan view of the machine according to the invention;

FIG. 3 is a detailed diagrammatic plan view of the input turret of the machine;

FIG. 8 is a detailed plan view of the output turret;

FIG. 8a is a detailed diagrammatic top plan view of the testing turret;

FIG. 8b is a circuit diagram of the testing device in the testing turret;

FIG. 9 is an elevational view of the defective battery expelling mechanism.

Figure 1:
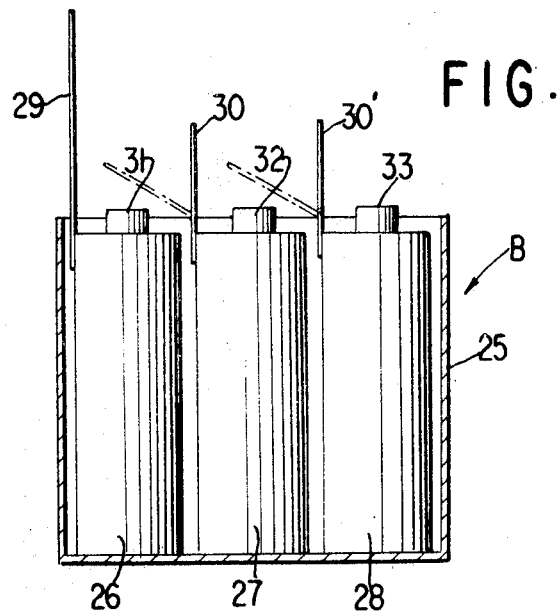

The machine shown in FIG. 2 comprises seven turrets including: a first transfer or input turret 10, a pickling and wire cambering and orienting turret 11, a second transfer turret 12, a soldering turret 13, a third transfer turret 14, a testing turret 15 and a fourth transfer or output turret 16. These turrets are supported for rotation on vertical shafts in a machine frame and are driven in the directions of their respective arrows by appropriate gearing and motive power in conventional manner.

The various steps of the process according to the invention are successively performed on batteries entrained on the various rotating turrets 11, 13 and 15. Batteries B (FIG. 1) whose cells have not yet been interconnected arrive on a conveyor 17 and are entrained and carried by the various turrets in the same order after respective treatments in each and in completely interconnected form after testing are carried away by an output conveyor 18. The respective turrets are positioned relative to each other in such a way that the dead angles of the respective turrets are reduced as possible, such dead angles being comprised between the evacuation and the insertion positions of the respective batteries, into respective turrets and no processing operation is performed on the batteries in such dead angles of the respective turrets.

Referring to FIG. 3, it is a diagrammatic plan view from above of the input transfer turret 10;

The input conveyor 17 is positioned tangentially to the input transfer turret 10 adjacent position I. A detecting device such as a contact 19 of a microswitch M is positioned at the delivery end of the conveyor 17. A transversely, reciprocally movable pushing device 20 is positioned to operate in a transversal direction in relation to the feeding motion of the conveyor 17. A vertically reciprocally movable shutter 21 which can be moved upwards into a blocking position is located at position I on the other side of the conveyor 17. A transversely reciprocally movable braking device such as a brake shoe 22 is positioned alongside the conveyor 17 adjacent to the pushing device 20.

The contact 19 of microswitch M is mounted on a guard screen 23 which is hinged on a fixed axle 23a. A fixed outer guard 24 surrounds the turret 10 extending from the location of axle 23a to the delivery position II of said turret 10.

As shown in FIG. 1, the batteries B which are transported by conveyor 17 and which arrive at the entrance to the input 10 at portion I comprise casings 25, each containing three unconnected cells 26, 27 and 28 which are suitably insulated from each other. One of the end cells such as cell 26 is provided with a vertically extending blade 29 which is intended to be an output terminal of the complete battery and which is welded to the individual cell casing of the said cell 26. The two other cells 27 and 28 are each provided with respective interconnecting wires 30 and 30', both of the same polarity as blade 29 and also welded respectively to the individual cell casings 27 and 28 of said cells. Each of the cells 26, 27 and 28 is provided with a central metallic contact cap such as caps 31, 32 and 33 which constitute its positive terminal.

The transfer of successive batteries B to the input turret 10 is affected as follows: As soon as a battery B on conveyor 17 arrives at transfer position I of the input conveyor 17, it engages and actuates movable contact 19 of the microswitch M. This, through a conventional electric circuit (not shown) simultaneously causes unlocking of the pushing piston 20 with forward motion thereof against said battery B and also causes the brake shoe 22 to be pushed forwardly in order to press it against and stop the next following battery. The required forward motion of the pushing device 20 is effected as by means of a flexible transmission such as a spring (not shown) and is dependent on the rotary motion of turret 10. When a berth C of the turret 10 lies in front of the pushing piston 20, if a battery B is located in position I, the bushing service 20 is unlocked by closure of switch M and is then able to act. It then pushes the battery B in position I forwardly towards and into the berth B. Simultaneously, with unlocking of the pushing piston or device 20, the electrically operated blocking shutter 21 is elevated to clear the entrance into said berth C and this elevation is continued until the battery B has been pushed into berth C.

Figure 4:
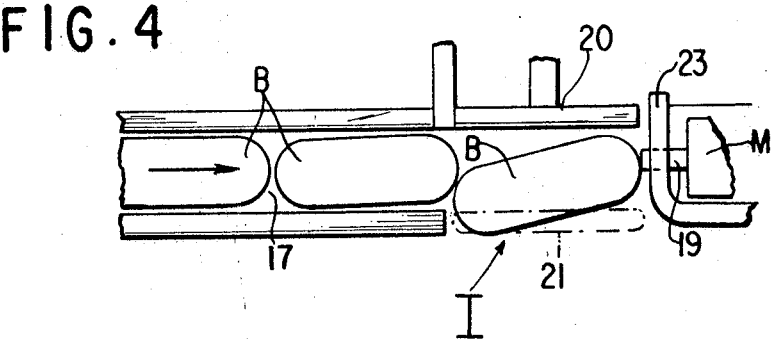
FIG. 4 is a schematic plan view of batteries on the input conveyor arriving at the entrance position to the input turret.

The various devices hereabove described are intended for preventing faulty insertion of the successive batteries B into the berths C of turret 10. The batteries have a generally oblong shape in section with rounded ends and have a tendency to swing askew as depicted in FIG. 4 when they arrive at position I. That is one reason why shutter 21 is elevated only at the beginning of the pushing motion of the piston 20. If required, a similar electrically operated shutter (not shown) can be located at the level of the upper end of the battery in order to prevent its toppling. Such a shutter would be coupled to and activated simultaneously with shutter 20 to clear the entrance into berth C at position I when the pushing piston 20 is unlocked so that the battery 16 at said position I may be pushed into said berth C of turret 10.

It is also possible to hold the batteries in proper position relative to the pushing device 20 as by means of a compressed air jet (not shown) which may be directed to blow the batteries at position I against said device 10, but this solution is costly.

The ends of the batteries as seen in FIGS. 2 and 4 are rounded. Thus, they have a tendency to slip side by side whenever they become jammed on conveyor 17. For this reason, the brake shoe is provided which is simultaneously activated on closure of switch contact 19 to brake the battery B directly behind the one arriving at position I and thus prevent the said following battery from exerting a pressure on the battery B positioned at I or on the activated pushing device 20 which, as noted, has a flexible transmission.

Figure 4A:
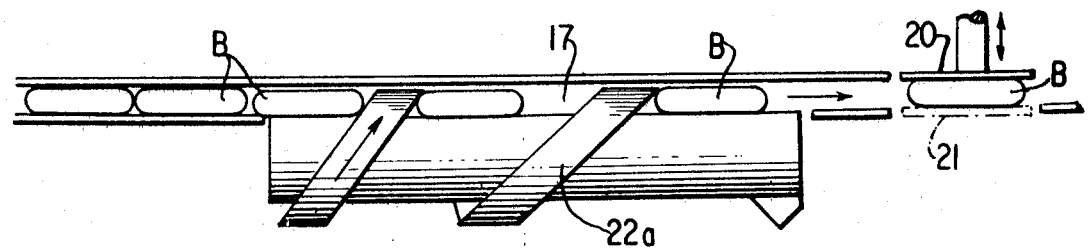
FIG. 4a is a similar view of a modification.

In another embodiment, the batteries B on conveyor 17 could be progressively and continuously spaced from each other before they arrive at position I for insertion into the berths C of the input turret 10 as by means of a variable pitch screw 22a (FIG. 4a) located alongside the conveyor 17. This embodiment would be particularly suitable for high speed machines.

In the case of an accidental faulty insertion of a battery into berth C, e.g. when a battery is inserted crosswise, the guard screen 23 is moved outwardly on its pivot axle 23a when the battery that has entered berth C at position I starts to move until the turret and its pivotal motion operates a safety switch S in an electric circuit which causes the machine to stop immediately.

Figure 5:
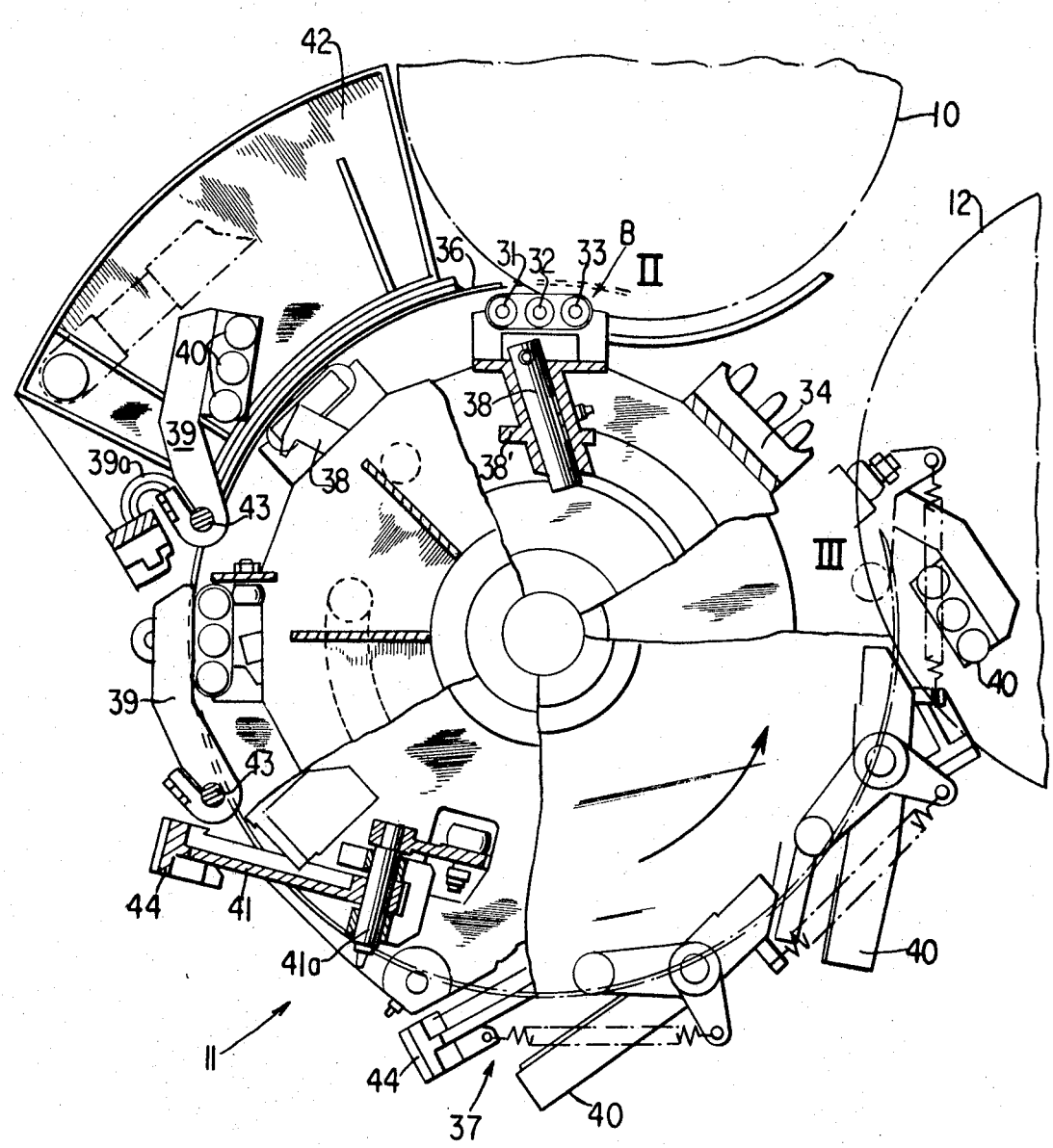
FIG. 5 is a detailed diagrammatic plan view of the first processing turret of the machine.

FIG. 5 illustrates in plan view the first processing turret 11.

This processing turret 11 is provided with pocket-like carriers 34 into which the successive batteries delivered thereto from the input turret 10 at position II are received and entrained. The battery B that has been entrained then is guided by means of an outer peripheral guard 36. This guard 36 extends around turret from position II to a position III said guard maintaining the entrained battery in its carrier 34 of said turret 11 during such transit.

Associated with each carrier 34 of processing turret 11, there are respectively a pushing member 38, a swivel arm 39 provided with three elastic keys 40 and a cambering lever 41.

The pushing member 38 is intended for engaging and restoring into alignment with the battery longitudinal axis the blade terminal 29 which may have been misaligned by inward movement onto turret 11 and for straightening the interconnecting wires 30 and 30' which may have been folded inwards during battery transfer to turrets 10 or 11. It is reciprocally movable in a sleeve 38' and may be cam actuated during rotation of turret 12.

A fixed constant level container can 42 containing a flux, cleansing or pickling solution is positioned adjacent to turret 12.

During the motion of the pusher 38, the arm 39 is elevated and pivoted in opposition to biasing spring 39a to dip into and pick up some solution from container 42 on its elastic keys 40 and then it is swiveled on its vertical pivot post 43 by spring 39a and moves so as to lie above the battery B entrained in its associated carrier 34. When the pushing device 38 is retracted under action of its cam, the arm 39 moves downwardly on its pivot post 43 and its keys 40 and deposits a drop of the flux, cleansing or pickling solution they have picked upon each of the three battery caps 31, 32 and 33.

The arm 39 is then moved upwards and rotates or swivels on its axle 43, thus yielding place to the cam-operated cambering lever 41. This lever 41 is provided with a comb 44 which engages, orients and cambers the battery wires 30 and 30' by moving longitudinally above the battery B. After the cambering operation, lever 41 which swivels on a horizontal pivot 41a under action of a cam moves clear of the said wires 30 and 30'.

The transfer turrets 12 and 14 are identical. They respectively comprise carriers 45 and 46 and outer guards 47 and 48 (see FIG. 2). These turrets 12 and 14 are used respectively for transferring the entrained batteries respectively from one processing turret 11 to the second processing turret 13, respectively, from position III where the battery B from turret 11 is inserted in the transfer turret 12 to position IV to where it leaves this transfer turret 12 and is entrained on soldering turret 13, and from position V of the latter to entraining point 52 where it is entrained in the testing turret 15.

Figure 6:
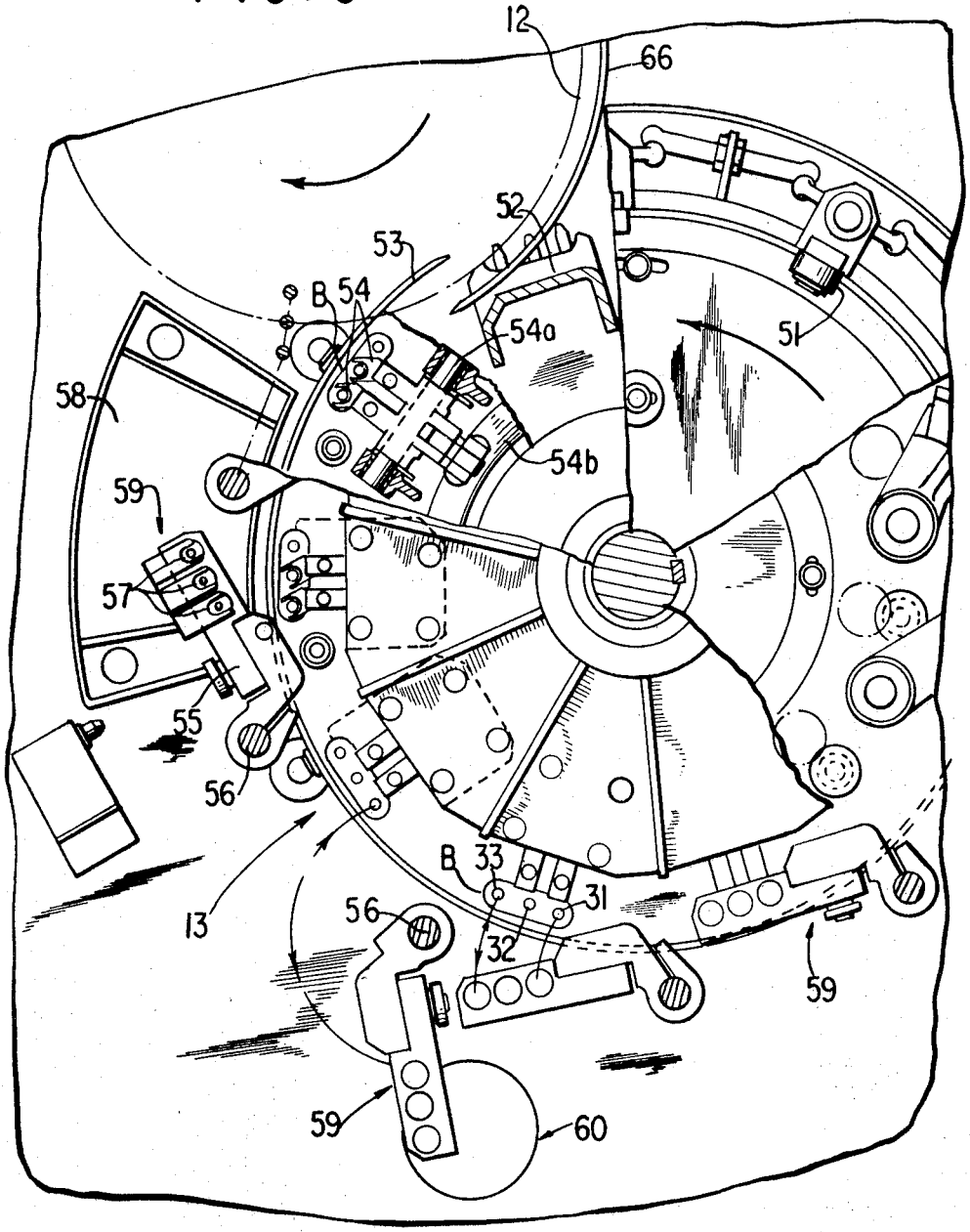
FIG. 6 is a detailed diagrammatic plan view of the soldering turret.
Figure 7:
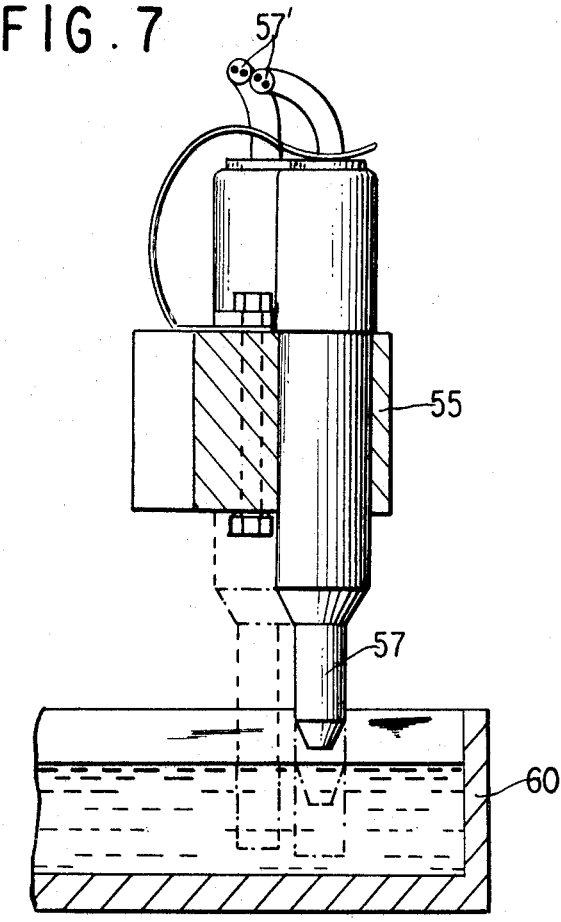
FIG. 7 is a detailed elevational view of the soldering mechanism.
Figure 10:
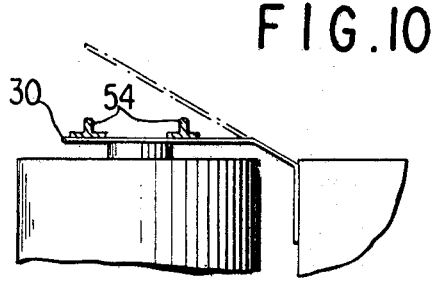
FIGS. 10, 11 and 12 are views of details of the soldering and testing arrangements.
Figure 11:
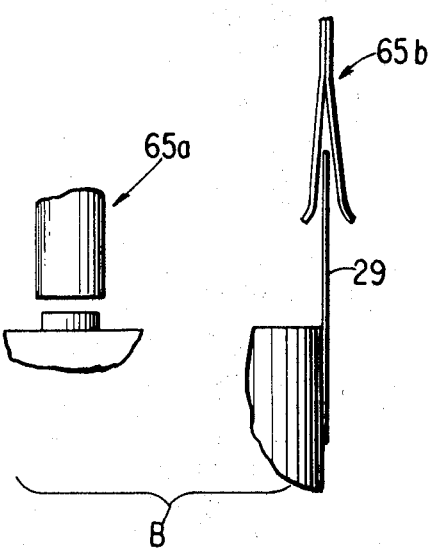
Figure 12:
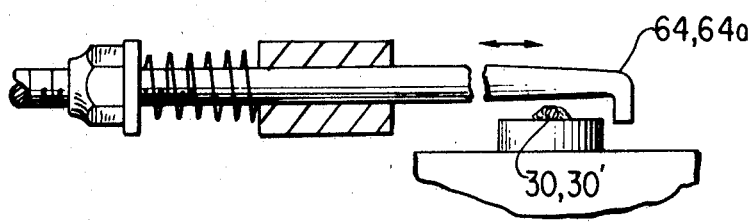

FIGS. 6 and 7 show details of the soldering turret 13.

This soldering turret 13 is provided with carriers 52 which are used for guiding the entrained battery B in cooperation with an outer guard 53 which latter surrounds turret 13 from position IV to position V. Soldering means is associated with each carrier 52. It comprises a pair of prongs 54 articulated on horizontal pivot 54a by cam 54b, an arm 55 rotatable around a vertical axle 56 under action of a cam and is provided with three soldering heating peens 57 (see FIG. 7).

The soldering operations are as follows: first the prongs 54 are moved under the influence of cam 54b and grasp the already cambered wires 30 and 30' and press them onto the corresponding caps 31 and 32 of the entrained battery. The arm 55 then performs the following operations. It is rotated on its axle 56 and fleetingly dips the ends of heating peens 57 into a pickling container or can 58 carrying a flux or pickling or cleansing solution. Then it is swung around its axle 56 and comes to the position shown at the lower left of FIG. 6 and reference 59. It then dips the ends of heating peens 57 into a tank 60 containing molten solder. This tank 60 is preferably of the so-called Flow-dipper type which has a minimum exposure of molten solder surface and with which it is possible to have a permanently clean surface at constant temperature and level. The arm 55 then is reversely rotated on its axle 56 and then moves back above the entrained battery 16.

These two last motions are performed in such a way that the speed of movement of the arm 55 in relation to tank 60 is as small as possible so that the three soldering peens 57 remain only long enough in tank 60 to pick up three drops of solder. It is particularly advantageous that the trajectory described by peens 57 comprise an elevated retrogression point situated above the level with the upper edges of tank 60, such being the case in the axample shown in FIG. 7. Peens 57 are heated by connecting the wires 57' of their heating elements (not shown) in a conventional electric heating circuit.

Another important point is that the motion of the arm 55 after its peens 57 have taken up the solder comprises very low accelerations or decelerations so that no drop of solder is lost. When the peens 57 are above the entrained battery B, the arm 55 moves down on its axle 56, the peens deposit the melted solder on the three caps 31, 32 and 33 and rise again after about half a second. Both interconnecting wires 30 and 30' are then soldered to caps 31 and 32 respectively and the cap 33 of the last battery cell 28 is provided with solder, thus preparing it for the application thereto of the positive output terminal (not shown). The described rotary and vertical motions of arm 55 and peens 57 on axle 56 are effected in conventional manner by cam means (not shown) related to the path of travel of an associated cam follower that moves with the arm 55 during rotation of turret 13. Other equivalent means may be used.

After a cooling period, thus enabling the solder to set, this time being about one second, the prongs 54 are elevated by cam 54b and the entrained battery 16 ultimately arrives at transfer position V (FIG. 2).

The entrained battery B then passes via transfer turret 14 from the soldering turret 13 to the testing turret 15 in similar manner to the previous transfer thereof from turret 12, thus arriving at position VI (FIGS. 2 and 8a) and enters testing turrets 15 (FIGS. 2 and 8a).

The mechanical and electrical testing turret 15, like the other processing turrets 11 and 13 is provided with carrier 61 and a guard 62, the latter intended for guiding the entrained battery B as it moves around with turret 15 from position VI to position VII.

A testing device 63 is associated with each battery carrier 61. Each testing device 63 comprises a pair of elastic fingers 64 and 64a for engagement with respective of the soldered wires 30 and 30' of the battery entrained on its associated carrier 61 to test the security of their soldered joints with caps 31 and 32. Each testing device also includes a pair of electrodes 65a and 65b insulatively mounted on a support element 65 and movable with the latter under cam action into engagement respectively with cap 33 and blade 29 of the assembled battery in the particular carrier 61. One of these electrodes 65a is connected in series with a voltage measuring device in form, for example, of a resistance 66. The other terminal of this resistance 66 is grounded. The other electrode 65b is connected to a fixed contact 67a of a normally open switch 67, whose movable contact 67b may be moved to closed condition with contact 67a by a cam in position VIII of the turret 15. In traverse of the latter from position VI toward exit position VII and near position VIII, conventional cams in the paths of traverse operate in the latter position to cause the elastic fingers 64a and 64 to engage the respective wires 30 and 30' and test the soundness of their soldered points with caps 31 and 32. If weak or loose, the wires are separated from the cap or caps by the fingers 64 and 64a so that the battery circuit is broken and zero voltage exists across its cap 33 and blade 29. At the same time, in said region VIII, the electrodes 65a and 65b respectively are activated by a conventional cam to become engaged with cap 33 and blade 29 and a suitable cam also closes contacts 67a and 67b of switch 67, putting the measuring device 66 and a relay R into the circuit of the battery being tested across its cap 33 and blade 29. The movable blade 67a of switch 67 is connected to one end of the coil of the relay R whose other end is grounded. Thus, when switch 67 is closed, if the current through the measuring device is normal, e.g. that provided by rated battery voltage of say 4.5 volts, the relay R is tripped to open a circuit of a solenoid coil 68a of an electromagnet 68 (FIG. 8) located adjacent the output turret 16. On the other hand, if this current through the measuring device is either zero because of a broken circuit at one of wires 30 or 30' or less than usual if the battery happens to be below its rated voltage, the relay R will not be tripped so that solenoid coil 68a of the electromagnet 68 (FIG. 8) will remain activated through its power source E and serve as part of a memory device to reject the defective battery in output turret 16 as will be described below.

After leaving position VIII, the battery tested thereat moves with turret 15 to position VII and is entrained there by the output turret 16 and moves around with the latter toward exit position IX for entrainment on output conveyor 18.

FIGS. 8 and 9 show details of the output turret 16.

The latter essentially comprises a dented wheel 69 provided with pockets or recesses 70 into which the entrained batteries are successively housed upon delivery from testing turret 15 at position VII and an outer peripheral guard 21 ensures the guiding of the entrained batteries 16 in their movement with turret wheel 69 from position VII to the delivery position IX adjacent conveyor 18.

The turret 16 also comprises a plate 72 (FIG. 9) provided with fingers 73 related to the dented wheel 68. For each pocket or recess 70 there is a corresponding finger 73 which accompanies it in its motion.

The electromagnet 67 already mentioned is fixed and situated alongside turret 16 in the dead angle of the said turret. It controls a bevelled element 74 pivotally movable around an axle 75.

An expelling device 76 acts to expel defective batteries 16 towards a container 77, at a position X in intermediate positions VII and IX.

The fingers 73 can slide vertically; they are maintained either in higher position or in lower position by means of two grooves 78 which cooperate with a catch 79.

The operation of this output turret 16 is as follows:

Fingers 73 are normally in their lower positions. When the battery is good, the electromagnet 68 is not energized and the entrained batteries are transferred from turret 16 at position 72 to the output conveyor 18.

When an entrained battery is found defective in turret 16, the voltage controlled relay R remains closed and energizes the electromagnet 68 so that the bevelled element 74 moves to a position in the path of a finger 73. The location of electromagnet 68 and of the bevelled element 74 is such that the said bevelled element then acts to elevate that finger 73 corresponding to the recess 69 of turret 16 which will receive the defective entrained battery B which has actuated the said relay. Then, when this defective battery arrives in front of the spring-actuated expelling device 76, the elevated finger 73 will act upon this device 76 and the defective battery will be pushed, thereby from its pocket 70 into the rejection container 77. Means are provided for resetting the displaced raised finger 73 into its initial lower position.

This means may be constituted e.g., by a bevelled cam 80 fixed in relation to the output turret 16 and should be preferably situated in the dead angle of this turret between its positions (VIII and IX). The good batteries are not affected at position X and are carried by turret 16 to position IX and onto output conveyor 18.

The automatic machine according to the invention has numerous advantages.

Due to the disposition of the rotary turrets in accord with a continuous kinamatic principle, it allows for any desired manufacturing rates.

The machine according to the invention is very reliable since it stops as soon as a battery is incorrectly inserted at position I by the opening of switch S.

Due to the specially designed trajectory of arm 55 bearing the heating soldering peens 57, it is possible to use only one solder-containing tank 60 while maintaining the soldering peens 57 for long enough periods in the said tank to pick up required drops of solder.

The memory device constituted by the relay, the electromagnet 68, the bevelled element 74 and the fingers 73 make it possible to detect defective batteries in testing turret 15 to expel them during their transit on the output turret 16 so that only sound batteries are delivered via the turret 16 at position IX to the exit conveyor 18.

The above-described embodiment of the invention has been presented merely for illustrative purposes and is in no way limitative, it being well understood that changes or modifications may be made within the scope of the appended claims. There is no intention, therefore, of limitation to the exact disclosure herein made.

What is claimed is:

1. A method of effecting interconnection automatically of a group of unconnected cells to form a battery at high manufacturing rate comprising the step of first assembling said group of unconnected cells in spaced proximity in a casing, each cell having a metallic central terminal cap and an unconnected interconnecting conduit element joined to the other terminal of each cell, then entraining and moving said cells automatically and successively through a trajectory comprising a plurality of successive independent tangentially disposed arcuate processing and transfer zones, in the first of said processing zones applying treating solution to said caps and cambering the respective interconnecting conduit elements for application to the respective caps of adjacent cells, then automatically trasferring said cells to a second of said processing zones and therein pressing the respective cambered interconnecting elements onto the respective underlying caps and soldering them thereto by applying soldering elements and solder thereto, then automatically transferring said cells to a third of said processing zones and therein testing the mechanical security of the soldered joints between elements and caps and also electrically testing the voltage of the group of now interconnected cells and thereafter automatically transferring the electrically tested interconnected cells to a further processing zone and therein rejecting those found defective as a result of testing in said third processing zone, the times of treating operations on each group of cells in each of said arcuate processing zones being the respective times of transit of each group of cells through each of the respective arcuate processing zones.

2. A method according to claim 1 wherein various arcuate zones have different arcuate lengths and times of transit through zones of different arcuate lengths are different.

3. A method according to claim 2, wherein the different arcuate lengths of various arcuate zones are generated by differently dimensioned radii.

References Cited

UNITED STATES PATENTS

| | | | |
|---|---|---|---|
| 1,723,727 | 8/1929 | Eckstein | 136—135 |
| 2,274,490 | 2/1942 | Mac Farland | 136—175.35 |
| 2,575,976 | 11/1951 | Rocle | 136—135 |
| 2,627,534 | 2/1953 | Arbogast | 136—135 XR |

FOREIGN PATENTS 347,908   1/1922   Germany.

JOHN F. CAMPBELL, Primary Examiner

R. W. CHURCH, Assistant Examiner

U.S. Cl. X.R.

29—430, 492, 493, 593, 628; 136—135, 175; 219—79, 85; 317—101